A. C. HALL.
INDICATOR FOR SPARK PLUGS.
APPLICATION FILED SEPT. 25, 1908.
930,855.
Patented Aug. 10, 1909.
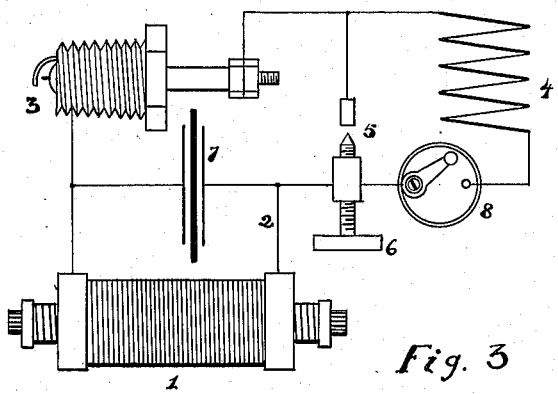
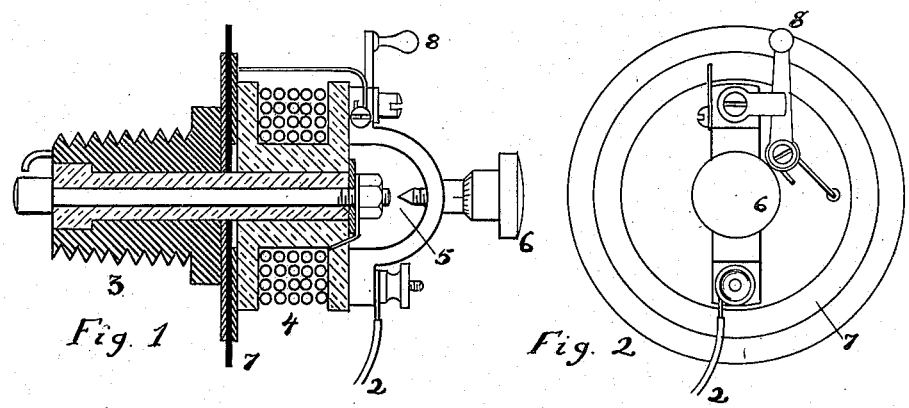
WITNESSES:
Nellie D. Keating.
F. C. Fliedner.
INVENTOR,
Alfred C. Hall,
BY
F. M. Wright,
ATTORNEY

UNITED STATES PATENT OFFICE.

ALFRED C. HALL, OF SEBASTOPOL, CALIFORNIA.

INDICATOR FOR SPARK-PLUGS.

No. 930,855.     Specification of Letters Patent.     Patented Aug. 10, 1909.

Application filed September 25, 1908. Serial No. 454,832.

*To all whom it may concern:*

Be it known that I, ALFRED C. HALL, a citizen of the United States, residing at Sebastopol, in the county of Sonoma and State of California, have invented new and useful Improvements in Indicators for Spark-Plugs, of which the following is a specification.

The object of the present invention is to provide means for indicating the presence, and measuring the strength, of the high tension electric spark, commonly known as the jump spark, generally used for gas engine ignition, whereby the operator of a gas engine using such a spark can by inspection ascertain the existence, and approximately determine the strength, of the spark in the interior of the cylinder.

In the accompanying drawing, Figure 1 is a section of the spark plug; Fig. 2 is a plan view; Fig. 3 is a diagrammatic view of the apparatus.

Referring to the drawing, 1 indicates an induction coil, in the secondary circuit 2 of which is included, as usual, a spark plug 3. In said circuit is also included a reactance coil 4, shunted by a spark gap 5, the points of which are separated by a distance which is varied by means of a micrometer screw 6. At each discharge of the induced oscillating current between the points of the spark plug, a spark tends to pass between the points of the spark gap 5. Hence the existence or non-existence of a spark at the plug 3 may be ascertained by inspection of the point 5, and an approximate estimation of the strength or power of the discharge at 3 may also be made by adjusting the micrometer screw 6, to vary the distance across which the sparks will pass.

Since the tendency of the spark to pass at 5 is due to the reactance of the coil 4 to the induced oscillating current, there can be no spark at the gap 5 when, by reason of the complete or a partial short circuit at the plug 3 the current does not oscillate, or if, for any reason, there is no spark at the plug 3.

If desired, the oscillations of the secondary current may be intensified, by the use of a condenser 7 of suitable capacity connected across the terminals of the secondary of the induction coil 1.

By interposing a switch 8 in the circuit of the reactance coil, the operator may detect the existence of a short circuit at the plug 3, as, in that case, when the switch 8 is open, a spark will pass at the gap 5, which will not be the case if the switch 8 is closed.

I claim:—

1. In combination with an electric circuit, a spark gap and a reactance coil in series therein, an adjustable spark gap in shunt with said reactance coil, and a switch in series with the reactance coil, substantially as described.

2. In combination with an electric circuit, a spark gap and a reactance coil in series therein, a second spark gap in shunt with said reactance coil, and a switch in series with the reactance coil, substantially as described.

3. In combination with an electric circuit, a spark gap and a reactance coil in series in said circuit, a second spark gap in shunt with said reactance coil, and a secondary condenser, substantially as described.

In testimony whereof I have hereunto set my hand in the presence of two subscribing witnesses.

ALFRED C. HALL.

Witnesses:
   F. M. WRIGHT,
   D. B. RICHARDS.